United States Patent
Lucas, deceased

[15] 3,679,278
[45] July 25, 1972

[54] OIL SEAL ARRANGEMENTS FOR ROTARY SHAFTS

[72] Inventor: Sydney Lucas, deceased, late of Harrow, England by Hilde Katie Lucas, administratix, 287 Preston Road, Middlesex, Harrow, England

[22] Filed: Sept. 2, 1970

[21] Appl. No.: 68,946

[30] Foreign Application Priority Data

Sept. 2, 1969 Great Britain......................43,383/69

[52] U.S. Cl..............................308/187.1, 277/23, 277/67
[51] Int. Cl.........................................................F16c 33/76
[58] Field of Search.................308/187.1, 187.2, 36.3, 36.4; 277/23, 67, 70

[56] References Cited

UNITED STATES PATENTS

| | | | |
|---|---|---|---|
| 1,770,496 | 7/1930 | Lawaczeck | 277/67 X |
| 2,125,446 | 8/1938 | Hurtt | 308/36.3 |
| 2,598,381 | 5/1952 | Hoffman | 308/36.4 X |
| 3,273,313 | 9/1966 | Livesey et al. | 55/46 |
| 3,378,104 | 4/1968 | Venable | 308/36.3 |
| 3,452,839 | 7/1969 | Swearingen | 308/36.3 |
| 2,266,407 | 12/1941 | Bruestle | 308/187.1 |

Primary Examiner—Martin P. Schwadron
Assistant Examiner—Barry Grossman
Attorney—Holman & Stern

[57] ABSTRACT

An oil seal arrangement for a rotary shaft which is supported by a bearing within an end closure of a casing, the casing having a shroud which extends around an extended portion of the shaft, and there is provided a passage in the shroud and through which air can be forced through the bearing into the casing and the shaft is provided with a passage through which air can escape from the casing. In order to prevent escape of oil from the casing a baffle is provided and through which the air leaving the casing passes, the baffle acting to coalesce any oil entrained with the air. The baffle is subjected to centrifugal force so that the coalesced oil will be returned to the interior of the casing.

6 Claims, 1 Drawing Figure

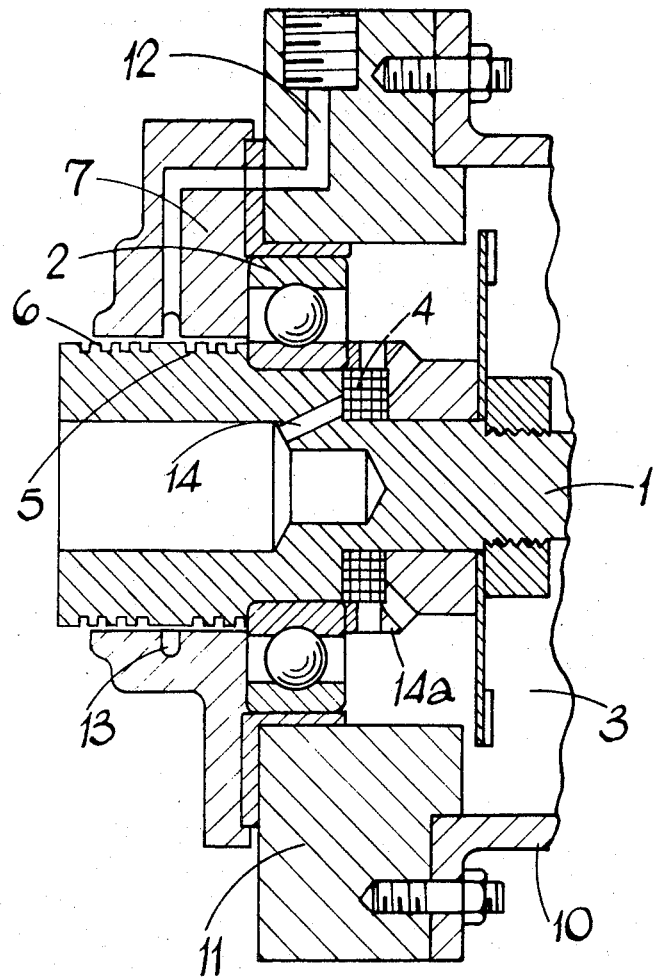

OIL SEAL ARRANGEMENTS FOR ROTARY SHAFTS

This invention relates to an oil seal arrangement for a rotary shaft of the kind comprising a shaft extending from within a hollow housing, an end closure for the housing, and a bearing mounted in said end closure, the housing containing oil for the bearing.

The object of the invention is to provide an oil seal arrangement for such a shaft in a simple and convenient form.

An oil seal arrangement in accordance with the invention comprises in combination, means for directing gas through the bearing into the housing thereby to minimize the flow of oil from the housing through the bearing, passage means formed in the shaft to allow the gas to escape from within the housing, said passage means incorporating an oil baffle which is mounted upon the shaft and which coalesces any oil mist, the oil being returned to the housing by the action of centrifugal force.

One example of an oil seal arrangement in accordance with the invention will now be described with reference to the accompanying drawing which is a sectional side elevation through a bearing incorporating the arrangement.

Referring to the drawing there is provided a casing 10 having an end closure 11 in which is mounted a bearing 2 for a rotary shaft 1. The end closure 11 is provided with an extension 7 of annular form and through which an enlarged portion of the shaft passes. The housing 3 contains oil for lubricating the bearing.

Formed in the end closure and the extension is a passage 12 through which air under pressure can be supplied to a circumferential groove 13 formed about the internal peripheral surface of the extension. Moreover, on opposite sides of the groove 13 and in the peripheral surface of the shaft are grooves 5 and 6. Groove 5 is a helical groove having a hand such that when the shaft is rotated it will tend to return any oil leaking from the bearing towards the bearing. Groove 6 is a series of spaced circumferential grooves. When air is supplied through the passage 12 it flows by way of the groove 5 towards the bearing and the flow of air displaces the oil back through the bearing 2 into the housing 3.

In order to allow the air to escape from the housing the shaft 1 is provided with a blind bore from which extends at least one obliquely disposed passage 14 and this passage communicates with an annular chamber defined around the shaft by an annular member 14a which bears against the inner member of the bearing 2. The annular chamber is in communication with the interior of the housing by way of apertures formed in the member 14, the apertures extending outwardly from the chamber. Moreover, mounted within the annular chamber is a baffle 4. In the particular example the baffle is in the form of a matrix of wire so as to form a porous structure. Alternative materials may be used such for instance as plastics. In operation, the air entering the housing 3 by way of the bearing passes into the annular chamber and any oil mist coalesces in the baffle so that relatively oil free air passes through the passage or passages 14 to the exterior of the housing. The oil collected in the baffle is flung outwardly by the action of centrifugal force into the interior of the housing.

Having thus described my invention what I claim as new and desire to secure by Letters Patent is:

1. An oil seal arrangement for a rotary shaft of the kind comprising a shaft extending from within a hollow housing, an end closure for the housing and a bearing receiving said shaft mounted in said end closure, the oil seal arrangement comprising, means for directing gas through the bearing into the housing thereby to minimize the flow of oil from the housing through the bearing, passage means formed in the shaft to allow the gas to escape from the housing, an oil baffle incorporated in said passage means, said oil baffle being is mounted upon the shaft and which coalesces acting to coalesces and oil mist, the oil being returned to the housing by the action of centrifugal force.

2. An oil seal arrangement for a rotary shaft of the kind comprising a shaft extending from within a hollow housing, an end closure for the housing and a bearing receiving said shaft mounted in said end closure, the oil seal arrangement comprising an extension of the end closure surrounding a portion of the shaft exterior of the housing, a passage formed in said extension for communication at one end with a source of gas under pressure, an annular space defined about said shaft, said passage communicating with said space, a helical groove intermediate said space and the bearing and along which gas flows through the bearing into the housing, a passage formed in said shaft, said passage communicating with the exterior and the interior of the housing and an oil baffle disposed at the end of said passage interior of the housing, said baffle acting to coalesce any oil mist tending to flow along said passage, said baffle being subjected to centrifugal force to return the oil retained by the baffle to the interior of the housing.

3. An oil seal arrangement as claimed in claim 2 in which said helical groove is formed in the shaft and is arranged to return any oil passing through the bearing to the housing.

4. An oil seal arrangement as claimed in claim 3 in which a plurality of circumferential grooves are formed in the shaft, the grooves being disposed on the opposite side of the annular space to said helical groove.

5. An oil seal arrangement as claimed in claim 4 in which said baffle is of annular form and is formed as a porous structure.

6. An oil seal arrangement as claimed in claim 5 in which the baffle is formed as a wire matrix.

* * * * *